(12) United States Patent
Kidokoro et al.

(10) Patent No.: US 7,954,897 B2
(45) Date of Patent: Jun. 7, 2011

(54) VEHICULAR SEAT

(75) Inventors: Hideaki Kidokoro, Yokohama (JP);
Toshihiko Yamaguchi, Yokohama (JP);
Mutsumi Tabata, Yokohama (JP)

(73) Assignee: NHK Spring Co., Ltd, Kanagawa (JP)

( * ) Notice: Subject to any disclaimer, the term of this patent is extended or adjusted under 35 U.S.C. 154(b) by 656 days.

(21) Appl. No.: 11/814,177

(22) PCT Filed: Jan. 18, 2006

(86) PCT No.: PCT/JP2006/301072
§ 371 (c)(1),
(2), (4) Date: Aug. 21, 2007

(87) PCT Pub. No.: WO2006/078040
PCT Pub. Date: Jul. 27, 2006

(65) Prior Publication Data
US 2008/0309142 A1 Dec. 18, 2008

(30) Foreign Application Priority Data

Jan. 18, 2005 (JP) .............................. 2005-010857

(51) Int. Cl.
*B60N 2/02* (2006.01)
(52) U.S. Cl. ................ 297/353; 297/216.13; 297/284.7; 297/320; 297/344.15
(58) Field of Classification Search ............. 297/216.13, 297/216.14, 284.4, 284.7, 344.15, 338, 353, 297/452.18, 320
See application file for complete search history.

(56) References Cited

U.S. PATENT DOCUMENTS

| | | | | |
|---|---|---|---|---|
| 4,313,637 A * | 2/1982 | Barley | ........................ | 297/284.4 |
| 4,339,150 A * | 7/1982 | McNamara et al. | ........ | 297/284.8 |
| 4,452,485 A * | 6/1984 | Schuster | .................... | 297/284.4 |
| 4,632,454 A * | 12/1986 | Naert | ......................... | 297/284.4 |
| 4,676,550 A * | 6/1987 | Neve De Mevergnies | ... | 297/353 |
| 5,071,190 A * | 12/1991 | Tame | ....................... | 297/344.15 |
| 5,129,707 A * | 7/1992 | Yamauchi | ................ | 297/216.14 |
| 5,240,308 A * | 8/1993 | Goldstein et al. | .......... | 297/284.3 |
| 5,553,919 A * | 9/1996 | Dennis | ...................... | 297/284.8 |
| 5,735,574 A * | 4/1998 | Serber | ........................ | 297/284.4 |
| 5,803,539 A | 9/1998 | Dewar et al. | | |
| 5,826,937 A | 10/1998 | Massara | | |
| 6,250,714 B1 * | 6/2001 | Nakano et al. | ........... | 297/216.12 |
| 6,554,359 B2 * | 4/2003 | Kohl et al. | ..................... | 297/338 |
| 6,669,143 B1 * | 12/2003 | Johnson | .................... | 244/122 R |
| 7,134,729 B2 * | 11/2006 | Dowty et al. | ............ | 297/452.18 |

(Continued)

FOREIGN PATENT DOCUMENTS

DE 19649587 A1 6/1998

(Continued)

OTHER PUBLICATIONS

Anonymous, Seat Back Construction for High-Strength Applications, Research Disclosure, Dec. 1992, vol. 344, No. 11, Mason Publications, Hampshire, Great Britain.

(Continued)

*Primary Examiner* — Peter R. Brown
(74) *Attorney, Agent, or Firm* — Sughrue Mion, PLLC

(57) ABSTRACT

In a vehicular seat 10 according to this invention, since a back shell 32 covers a back frame 31, as in the case where the shape of a seat back is formed of the urethane pad, the shape of the seat back is not easily changed. Thus, the passenger can be surely held. Further, since the back shell 32 is displaceably supported for the back frame 31, the back shell 32 is displaced according to the figure or posture of the passenger. This permits the passenger to sit with good riding comfort.

15 Claims, 5 Drawing Sheets

U.S. PATENT DOCUMENTS 7,255,395 B2 * 8/2007 Garrido .................. 297/284.7
2003/0006640 A1 1/2003 Yasuda et al.

FOREIGN PATENT DOCUMENTS

FR 2 779 393 A1 12/1999
JP 8-205958 A 8/1996

OTHER PUBLICATIONS

Chinese Office Action issued in Application No. 2006800026236, dated Sep. 4, 2009.

* cited by examiner

VEHICULAR SEAT

TECHNICAL FIELD

This invention relates to a vehicular seat, and more particularly to a vehicular seat capable of reducing burden or fatigue of a passenger.

BACKGROUND ART

Conventionally, there is known a vehicular seat capable of reducing burden or fatigue for the waist of a passenger (see Patent Literature 1).

As shown in FIG. 5, a seat device 100 incorporates a seat cushion frame 101 within a seat cushion. In this seat cushion, a substantially rectangular cushion plate 103 is suspended by a plurality of coil springs 102 whose one end is connected to the left or right side wall of the seat cushion frame 101. A seat back frame 104 constituting a seat back and the seat cushion frame 101 are provided rotatably through a hinge 106. The hinge 106 is equipped with a recliner 105 which permits the inclining angle of the seat back for the seat cushion to be adjusted.

In the seat back frame 104, vertically extending brackets 108 are provided through guide rail brackets 107. Back plates 109 are provided slidably along the brackets 108. Connecting members 110 are provided between the lower end of the back plates 109 and the rear of the cushion plate 103.

Therefore, when the cushion plate 103 supporting a seating area is vertically displaced, the back plates 109 are also moved vertically through the connecting members 110. Thus, the waist supporting area moves together with the back supporting area. Accordingly, in the vicinity of a waist area, slippage does not occur between the passenger and seat back, thereby permitting the fatigue of the waist to be reduced.

Patent Literature 1: Japanese Patent Unexamined Publication No. JP-A-8-205958 (FIG. 3).

Meanwhile, in the seat device 100 disclosed in Patent Literature 1, a cushion material such as an urethane pad is placed on areas of the seat cushion and seat back in contact with the passenger thereby to assure good riding comfort. However, it has been desired to further improve the holding quality for holding the posture of the passenger.

DISCLOSURE OF THE INVENTION

An object of this invention is to provide a vehicular seat capable of assuring good riding comfort and firmly holding the posture of a passenger.

In order to attain the above object, according to a first aspect of the present invention, there is provided a vehicular seat comprising:
  a seat cushion on which a passenger sits, and comprising a cushion frame supported by a vehicle body; and
  a seat back serving as a back for the passenger, and comprising:
    a back frame rotatably connected to the cushion frame; and
    a back shell covering the back frame,
  wherein the back shell is supported to be displaceable for the back frame.

In the vehicular seat constructed as described above, since the back shell covers the back frame, as in the case where the shape of the seat back is formed of a urethane pad, the shape of the seat back is not easily changed. Thus, the passenger can be surely held. Further, since the back shell is displaceably supported for the back frame, when the passenger sits, the back shell is displaced according to the figure or posture of the passenger. This permits the passenger to sit with good riding comfort even for a long period of riding.

According to a second aspect of the present invention, as set forth in the first aspect of the present invention, it is preferable that the back shell is displaceable for the back frame in a vertical direction of the back frame.

In the vehicular seat thus constructed, the back shell is supported vertically displaceably for the back frame, the back shell can be vertically displaced according to the vertical movement of a passenger due to his sitting action. Thus, the passenger can be surely held to thereby sit with good riding comfort.

According to a third aspect of the present invention, as set forth in the second aspect of the present invention, it is preferable that the back shell is supported for the back frame by a cam follower so as to be movable along the back frame.

In the vehicular seat thus constructed, the back shell is supported by the cam follower so as to be vertically displaceable relative to the back frame. Therefore, the back shell can be moved smoothly and with no fall for the back frame and so can be displaced according to the body of the passenger.

According to a fourth aspect of the present invention, as set forth in the third aspect of the present invention, it is preferable that the back shell is displaceable for the back frame in a back-and-forth direction of the back frame.

In the vehicular seat thus constructed, since the back shell is displaced for the back frame in a back-and-forth direction of the back frame, the back shell can be moved in the back-and-forth direction according to the back-and-forth movement of a passenger due to his sitting action. Thus, the passenger can be surely held and to thereby sit with good riding comfort.

According to a fifth aspect of the present invention, as set forth in the fourth aspect of the present invention, it is preferable that the back shell is supported for the back frame by an X-link mechanism.

In the vehicular seat thus constructed, since the back shell is supported to be displacable in the back-and-forth direction for the back frame by the X-link mechanism, the back shell can be displaced smoothly for the back frame. Thus, when the passenger moves in the back-and-forth direction, the back shell can be displaced integrally to the body of the passenger, thereby permitting the passenger to be surely held.

According to a sixth aspect of the present invention, as set forth in any one of the first through fifth aspects of the present invention, it is preferable that the back shell has a holding shape according to a human body.

In the vehicular seat thus constructed, when the shape of the seat back is formed of the urethane pad, the shape of the seat back is not easily changed. Thus, the passenger can be surely held by a hard back shell having the holding shape according to the human body. In addition, by forming a thin pad on the surface of the back shell, soft comfortable touching can be easily given to the passenger. Thus, by realizing the structure in which the capability of holding the passenger and comfortable touching are functionally separated, excellent seating sensation can be given.

According to a seventh aspect of the present invention, as set forth in any one of the first through seventh aspects of the present invention, it is preferable that the seat cushion has a cushion shell provided above the cushion frame and that the cushion shell is supported vertically displaceably for the cushion frame.

In the vehicular seat thus constructed, since the cushion shell is provided vertically displaceably above the cushion frame, when the passenger vertically moves due to his sitting action, the cushion shell also moves vertically. Thus, as in the case where the shape of the seat cushion is formed of the urethane pad, the shape of seat cushion is not readily changed, thereby permitting the passenger to be surely held.

According to an eighth aspect of the present invention, as set forth in the seventh aspect of the present invention, it is preferable that the cushion shell and the back shell are rotatably connected to each other through a hinge.

In the vehicular seat thus constructed, since the cushion shell is rotatable for the back shell which is displaceably provided for the back frame, when the cushion shell moves vertically due to the vertical movement of the passenger, the back shell also vertically moves. Simultaneously with this, the angle of the back shell changes. Thus, the passenger can be surely held as a whole, and can sit with good riding comfort.

According to a ninth aspect of the present invention, as set forth in the seventh or eighth aspect of the present invention, it is preferable that the cushion shell is supported for the cushion frame by an X-link mechanism.

In the vehicular seat thus constructed, since the cushion shell is supported vertically displaceably for the cushion frame through the X-link mechanism, the cushion shell can be supported vertically displaceably with no vibration by a simple mechanism.

According to a tenth aspect of the present invention, as set forth in any one of the seventh through ninth aspects of the present invention, it is preferable that a cushion supporting member which is elastically deformable is provided below the cushion shell.

In the vehicular seat thus constructed, since the cushion supporting member absorbs the vertical vibration of the cushion shell, the riding comfort for the passenger can be further improved so that the passenger permits the displacement with no problem.

According to an eleventh aspect of the present invention, as set forth in any one of the seventh through tenth aspects of the present invention, it is preferable that the cushion shell has a holding shape according a human body.

In the vehicular seat thus constructed, when the shape of the seat cushion is formed of the urethane pad, the shape of the seat cushion is not easily changed. Thus, the passenger can be surely held by a hard cushion shell having the holding shape according the human body. In addition, by forming a thin pad on the surface of the cushion shell, soft comfortable touching can be easily given to the passenger. Thus, by realizing the structure in which the capability of holding the passenger and touching sensation are functionally separated, excellent comfortable seating can be provided.

In accordance with the vehicular seat according to illustrative embodiments of the invention, good riding comfort can be assured, and the posture of the passenger can be further firmly held. In particular, conventionally, the thick urethane pad formed the shape of the seat and also served the function of holding the passenger. On the other hand, in accordance with the vehicular seat according to this invention, the hard shell structure can improve the capability of holding the passenger, and the displaceability of the shells can keep the holding capability for changes in the passenger's posture and in the vibration of the vehicle. Further, by forming a relatively thin pad on the surface of the shells, soft comfortable touching can be easily given to the passenger, thereby drastically improving the riding comfort.

DESCRIPTION OF REFERENCE NUMERALS

Figure 1:
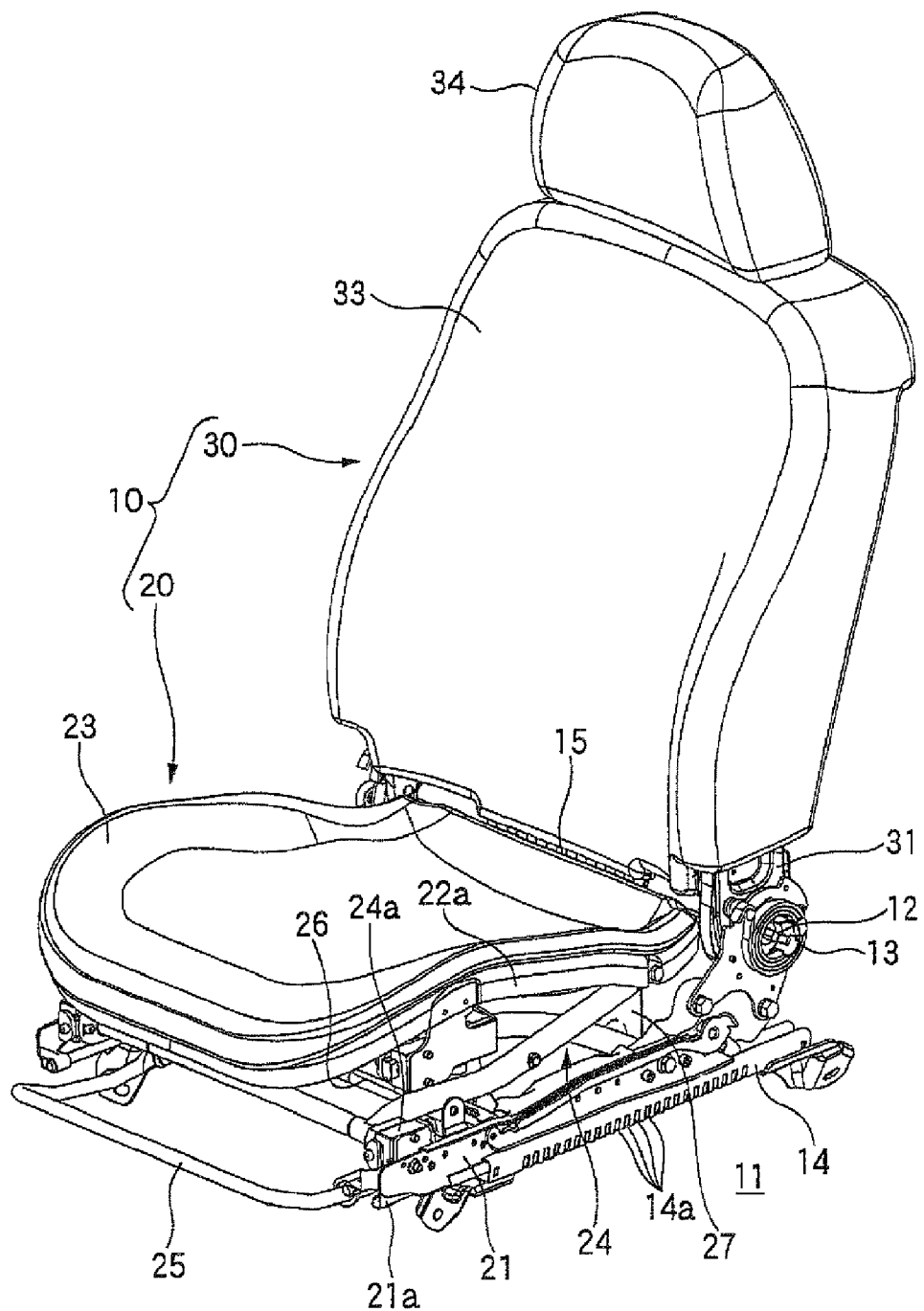
FIG. 1 is a perspective view of a vehicular seat according to an embodiment of this invention.

10 vehicular seat
11 vehicle body
15 hinge
20 seat cushion
21 cushion frame
22 cushion shell
24 X-link mechanism
27 cushion supporting pad (cushion supporting member)
30 seat back
31 back frame
32 back shell
35b X-link mechanism
35d cam follower

BEST MODE FOR CARRYING OUT THE INVENTION

Now referring to the attached drawings, a detailed explanation will be given of an embodiment of the vehicular seat according to this invention.

Figure 2:
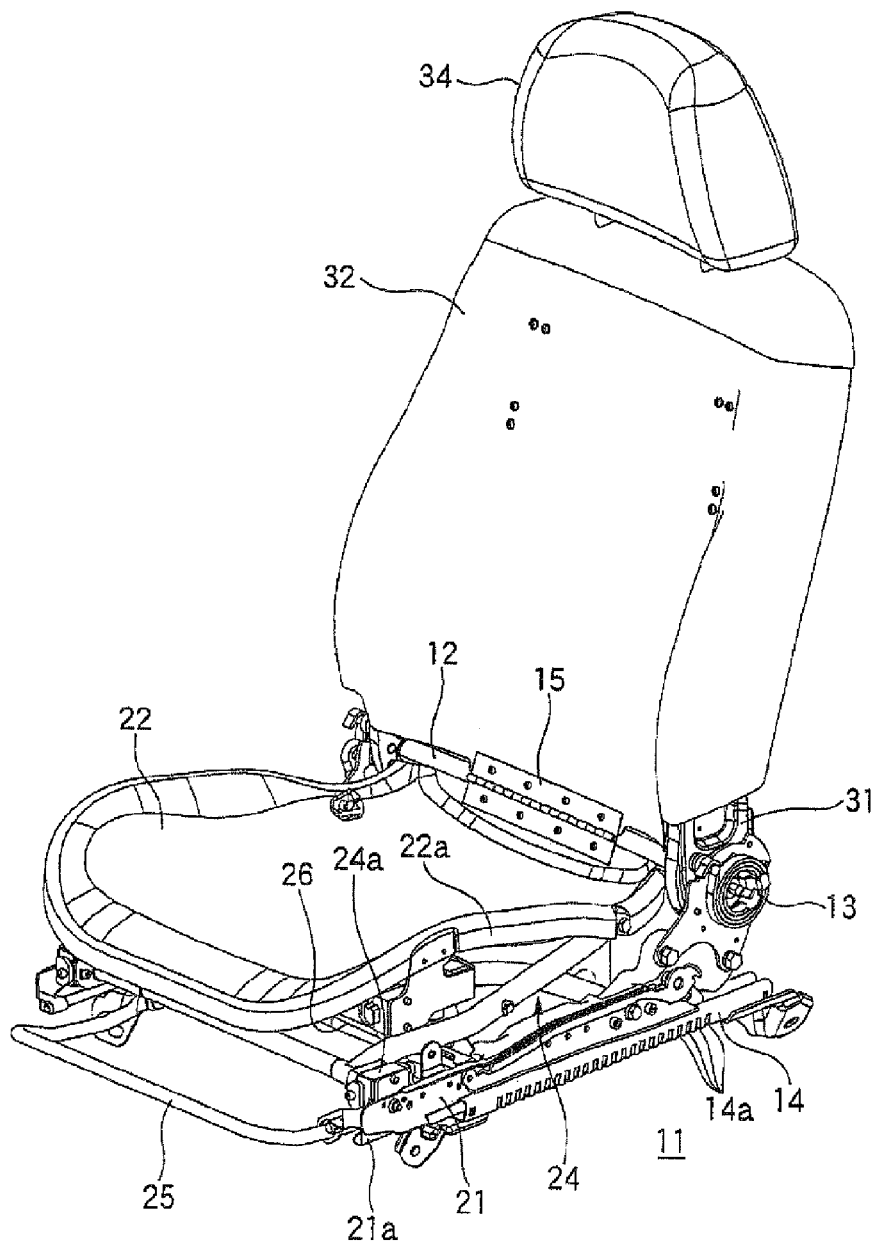
FIG. 2 is a perspective view of the vehicular seat in a state where a urethane pad on the surface of the vehicle-use has been removed.
Figure 3:
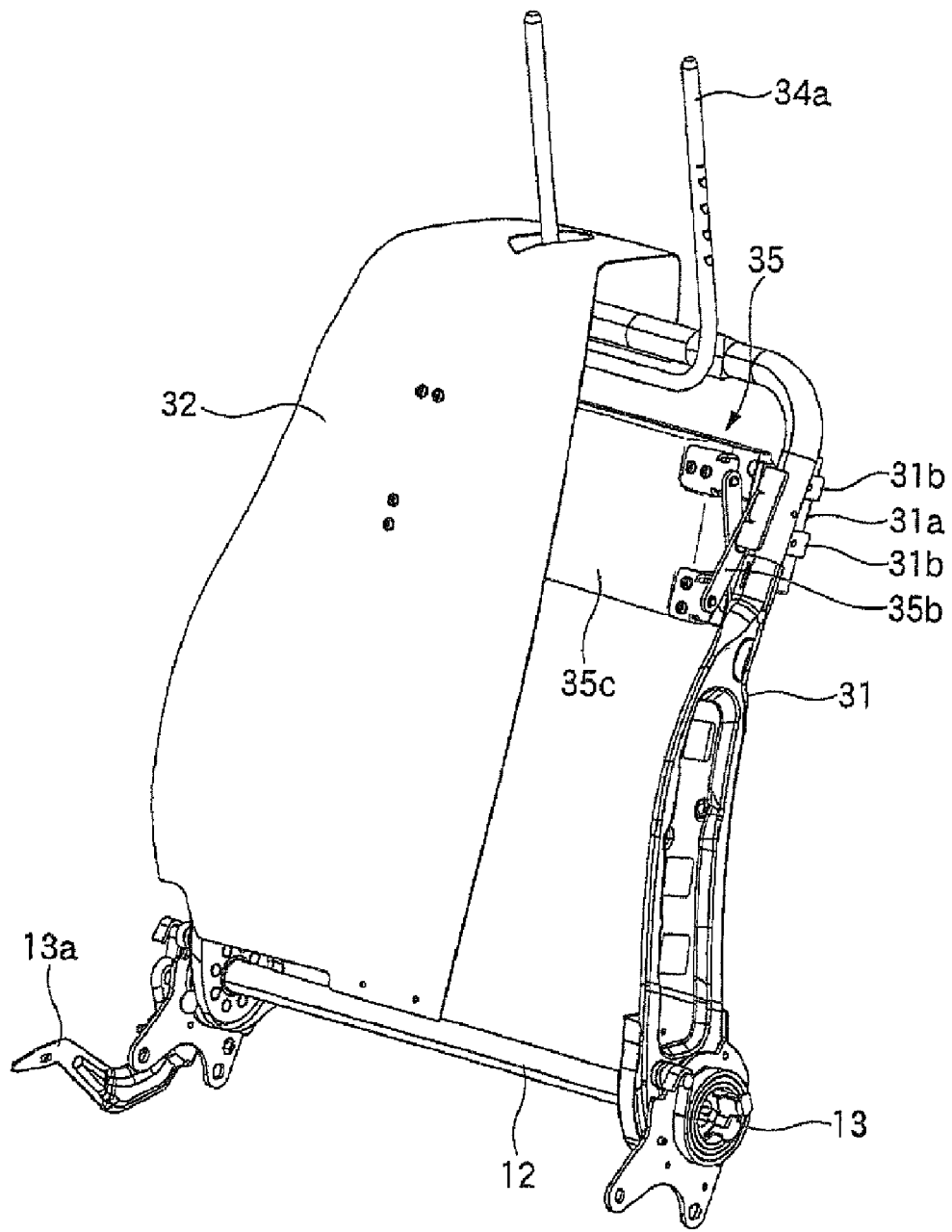
FIG. 3 is a perspective view of a back frame when seen from front.
Figure 4:
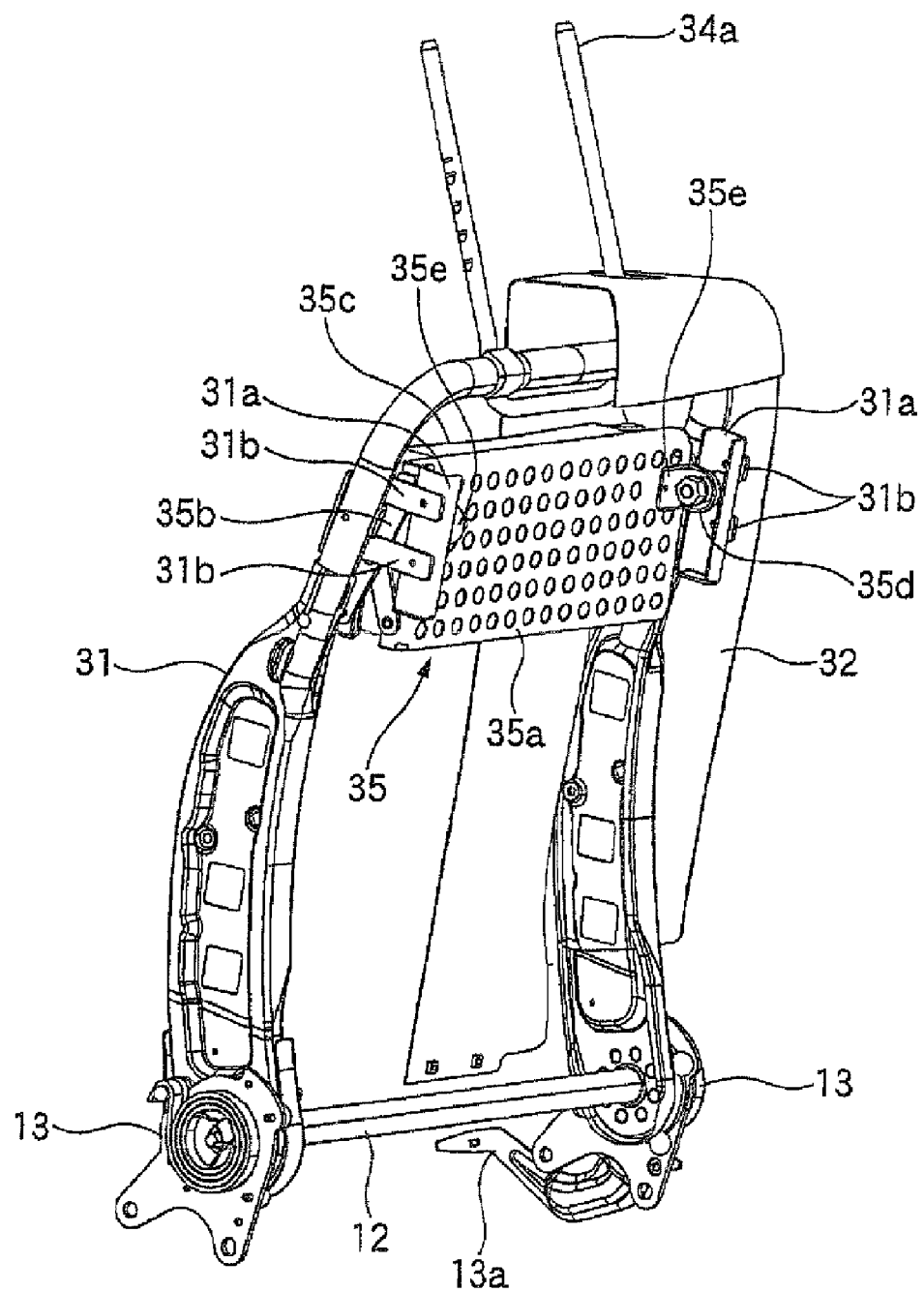
FIG. 4 is a perspective view of a back frame when seen from behind.
Figure 5:
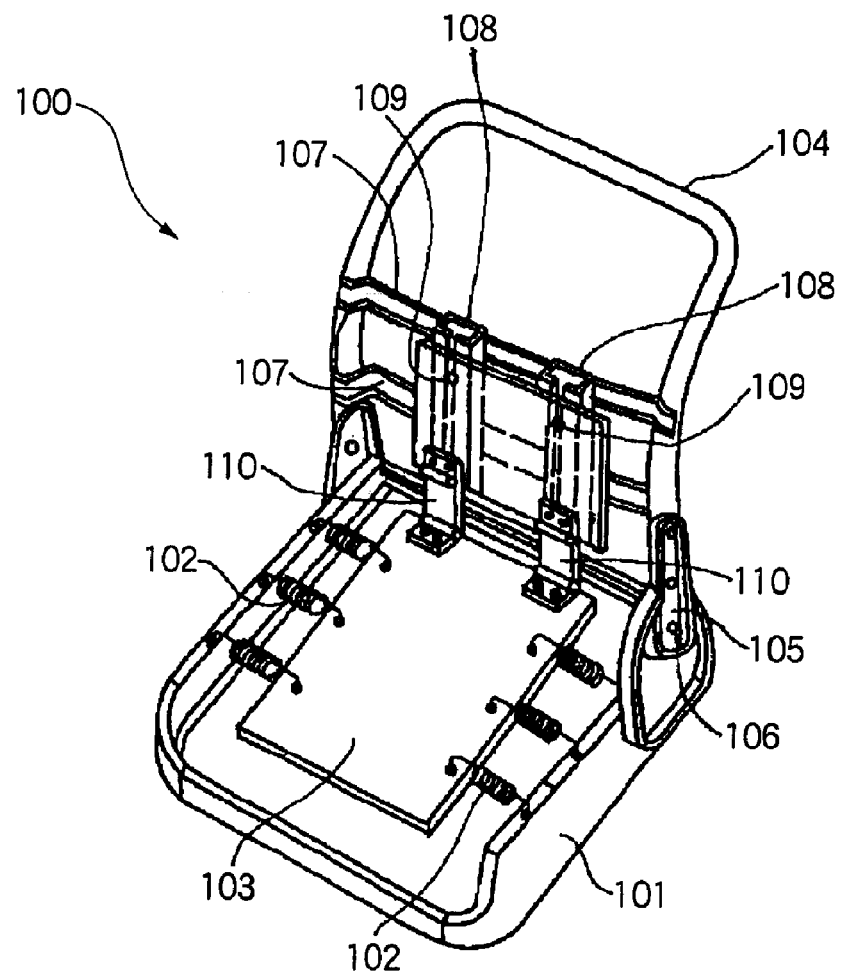
FIG. 5 is a perspective view of a conventional seat device.

FIG. 1 is a perspective view of a vehicular seat according to an embodiment of this invention. FIG. 2 is a perspective view of the vehicular seat in a state where a urethane pad on the surface of the vehicular seat has been removed. FIG. 3 is a perspective view of a back frame when seen from the front. FIG. 4 is a perspective view of a back frame when seen from behind.

As seen from FIGS. 1 to 4, a vehicular seat 10 according to an embodiment of this invention is provided with a seat cushion 20 on which a passenger sits and a seat back 30 serving as a back for the passenger. A cushion frame 21 of the seat cushion 20 is supported by a vehicle body 11, and a back frame 31 of the seat back 30 is rotatably connected to the cushion frame 21. The seat back 30 has a back shell 32 covering the back frame 31 and the back shell 32 is supported to be displaceable for the back frame 31.

The back shell 32 covering the back frame 31 is formed in a shape capable of holding a human body so that the back of a passenger can be surely held by metal or hard resin. Further, the surface on the side of the passenger of the back shell 32 is covered with a thin (e.g. 10 mm to 30 mm) urethane pad 33 so that the passenger can sit with good riding comfort. The upper portion of the rear of the back shell 32 is attached to a back supporting mechanism 35 which is movable in a vertical direction and in a back-and-forth direction for the back frame 31. Thus, the back shell 32 is movable in the vertical direction and in the back-and-forth direction for the back frame 31. Incidentally, the central and lower areas of the back shell 32 are supported freely for the back frame 31.

The back supporting mechanism 35 includes a back supporting plate 35a, X-link mechanisms 35b attached to the front side of the back supporting mechanism 35a and a back supporting pad 35c attached to the X-link mechanisms 35b.

To both left and right ends of the back of the back supporting plate 35a, cam followers 35d are attached through brackets 35e. To the vicinity of the upper left and right ends of the back frame 31, these cam followers 35d are attached in the vertical direction through attaching pieces 31b. For example, the cam followers 35d are vertically movable along guide rails 31a made of a channel material, respectively. Thus, the back supporting plate 35a is not movable in the back-and-forth direction for the back frame 31 but movable in a vertical direction along the back frame 31.

As seen from FIG. 4, the rear lower end of the X-link mechanism 35b is rotatably pivoted on the back supporting plate 35a whereas the rear upper end of the X-link mechanism 35b is slidably supported by the back supporting plate 35a. On the other hand, as seen from FIG. 3, the front of the X-link mechanism 35b is attached to the back shell 32. Between the back shell 32 and the back supporting plate 35a, the back supporting pad 35c is provided.

Therefore, for the back frame 31, the back shell 32 is vertically movably supported by the cam followers 35d and back-and-forth movably supported by the X-link mechanism 35b. Further, shock in back-and-forth direction for the back shell is absorbed by the X-link mechanism 35b and the back supporting pad 35c.

Further, a head rest frame 34a of a metallic bar or pipe (preferably, steel) formed in a substantially U-shape is attached to the upper end of the back frame 31 so that the head rest frame 34a penetrates upwards through the back shell 32 and urethane pad 33. A head rest 34 is attached to the head rest frame 34a. The surface of the headrest 34 to be in contact with the head of the passenger is covered with the urethane pad. The headrest is provided vertically adjustably according to a physique of the passenger.

As seen from FIG. 2, in the seat cushion 20, above the cushion frame 21, by metal or hard resin, a cushion shell 22 is formed in a shape holding a human body so as to be able to surely hold a buttock of the passenger. The surface of the cushion shell 22 is covered with a thin (e.g. 10 mm to 30 mm) urethane pad 23 so that the passenger can sit with good riding comfort. Incidentally, along an outer periphery of a bottom of the cushion shell 22, a shell frame 22a supporting the cushion shell 22 from lower side is provided.

The cushion frame 21 is provided along a pair of left and right guide rails 14, 14 provided in a back-and-forth direction of a vehicle body 11 so that they can be moved in back-and-forth direction and positioned at a stopping position. The guide rail 14 has stopping positions of recesses 14a formed at predetermined pitches. The seat 10 can be fixed at a predetermined stopping position in such a manner that the securing pieces (not shown) formed on the cushion frame 21 fit in the recesses 14a.

Incidentally, by operating an operation bar 25a attached to the front of the cushion frame 21, the securing pieces are removed from the recesses 14a so that the seat 10 is made movable back and forth.

X-link mechanisms 24 are provided above the cushion frame 21. The rear lower end of the X-link mechanism 24 is rotatably pivoted on the slide rail 21a provided in the cushion frame 21, or on the rear end of the cushion frame 21. At the front lower end of the X-link mechanism 24, a slide guide 24a is provided so that the cushion shell moves back and forth along the slide rail 21a in accordance with the vertical operation of the X-link mechanism 24. To the upper portion of the X-link mechanisms 24, a shell frame 22a of the cushion shell 22 is attached. Thus, the cushion shell 22 is made vertically movable for the vehicle body 11.

The left and right slide rails 21a, 21a are connected to each other by a cushion support plate 26. Between the cushion shell 22 and the cushion support plate 26, a cushion supporting pad 27 serving as a cushion supporting member 27 is located.

Thus, when the passenger sits on the seat cushion 20, the cushion shell 22 is vertically moved by the X-link mechanisms 24 and the cushion supporting pad 27 is elastically deformed so that shock when the cushion shell 22 descends can be absorbed. Further, vibration when the vehicle body 11 vertically vibrates can be also absorbed, thereby giving good riding comfort.

Between the rear lower ends of the left and right slide rails 21a, 21a of the cushion frame 21, an axial member 12 is provided. To the axial member 12, the left and right lower ends of the back frame 31 are rotatably attached.

Incidentally, between the cushion frame 21 and the back frame 31, a reclining device 13 is attached. By operating a lever 13a, the inclining angle of the back frame 31 for the cushion frame 21 can be changed. And by letting go of the lever 13a, the back frame 31 can be fixed at a desired angle.

Further, as seen from FIGS. 1 and 2, the rear end of the cushion shell 22 and the lower end of the back shell 32 are rotatably connected to each other through a hinge 15. Thus, simultaneously when the cushion shell 22 is vertically displaced, the back shell 32 is also vertically displaced. At this time, according to the posture of the passenger, the inclining angle of the back shell 32 can be appropriately changed.

Next, an explanation will be given of an operation of the vehicular seat 10 described above.

First, when the passenger sits on the seat cushion 20, the cushion shell 22 is guided by the X-link mechanisms 24 so as to descend, thereby forcibly shrinking the cushion supporting pad 27 located between the cushion shell 22 and the cushion supporting plate 26. The cushion shell 22 stops at a position where the weight of the passenger balances the resistance of the X-link mechanisms 24 and the elastic deformation of the cushion supporting pad 27. With the descent of the cushion shell 22, the back shell 32 connected thereto through the hinge 15 also descends. Simultaneously, in the seat back 30 also, when the passenger reclines there, the back shell 32 is guided by the X-link mechanisms 35b to move rearwards. The back shell 32 elastically deforms the back supporting pad 35c located between the back shell 32 and the back supporting plate 35a and thereby stops at a position where the elastic deformation balances the reclining force of the passenger.

In accordance with the vehicular seat 10 described above, since the back shell 32 covers the back frame 31, as in the case where the shape of the seat back is formed of the urethane pad, the shape of the seat back is not easily changed. Thus, the passenger can be surely held. Further, since the back shell 32 is displaceably supported for the back frame 31, the back shell 32 is displaced according to the figure or posture of the passenger. This permits the passenger to sit with good riding comfort and reduce the burden or fatigue for the waist of the passenger.

Incidentally, the vehicular seat according to this invention should not be limited to the embodiment described above, but can be appropriately modified or improved.

For example, in the above embodiment, the cushion shell 22 and the back shell 32 were connected to each other by the hinge 15. However, without being limited to such an example, they can be connected by a member with elasticity and high strength.

Further, although the cushion shell 22 was vertically movably provided by the X-link mechanisms 24, another guiding mechanism may be adopted.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

The subject patent application is based on a Japanese patent application No. P.2005-010857 filed on Jan. 18, 2005 and the contents thereof are incorporated herein by reference.

INDUSTRIAL APPLICABILITY

As understood from the description hitherto made, the vehicular seat according to this invention gives the advantages of assuring good riding comfort and surely holding the posture of the passenger, and so is useful as a vehicular seat capable of reducing the burden or fatigue for the waist of the passenger.

The invention claimed is:

1. A vehicular seat comprising:
a seat cushion configured for seating a passenger, and comprising a cushion frame supported by a vehicle body; and
a seat back serving as a back for the passenger, the seat back comprising:
a back frame rotatably connected to the cushion frame; and
a back shell covering the back frame,
wherein the back shell is attached to the back frame by way of a first displacement mechanism such that the back shell is displaceable relative to the back frame along a substantially longitudinal direction of the back frame,
wherein the back shell is attached to the back frame by way of a second displacement mechanism such that the back shell is displaceable relative to the back frame on along a substantially horizontal direction extending from a front of the back frame to a rear of the back frame,
wherein the back shell is attached to the back frame by an intermediate member,
wherein said intermediate member is displaceable relative to the back frame along the substantially horizontal direction by way of the second displacement mechanism, and
wherein said intermediate member is displaceable relative to the back frame along the substantially longitudinal direction by way of the first displacement mechanism.

2. The vehicular seat according to claim 1, wherein the first displacement mechanism comprises a cam follower,
wherein the intermediate member is attached to the cam follower, and
wherein the cam follower is attached to the back frame so as to be movable along the back frame and, thus, the intermediate member is also movable along the back frame.

3. The vehicular seat according to claim 1, wherein the second displacement mechanism comprises an X-link mechanism attached between the intermediate member and the back shell.

4. The vehicular seat according to claim 1, wherein the back shell has a holding shape suitable for holding a human body.

5. A vehicular seat according to claim 1, wherein the seat cushion has a cushion shell provided above the cushion frame, and
wherein the cushion shell is supported by way of a third displacement mechanism such that the cushion shell is displaceable relative to the cushion frame along a substantially vertical direction of the cushion frame.

6. The vehicular seat according to claim 5, wherein the cushion shell and the back shell are rotatably connected to each other through a hinge.

7. The vehicular seat according to claim 5, wherein the cushion shell is attached to an upper portion of an X-link mechanism and the cushion frame is attached to a lower portion of the X-link mechanism.

8. The vehicular seat according to claim 5, wherein a cushion supporting member, which is elastically deformable, supports the cushion shell and is provided above the cushion frame.

9. The vehicular seat according to claim 5, wherein the cushion shell has a holding shape suitable for holding a human body.

10. The vehicular seat according to claim 1, wherein the entire back shell is displaceable relative to the back frame along the substantially horizontal direction.

11. The vehicular seat according to claim 1, wherein the intermediate member is displaceable along the substantially horizontal direction according to horizontal movement of the passenger.

12. The vehicular seat according to claim 11, wherein the intermediate member is displaceable along the substantially longitudinal direction according to movement of the passenger in the substantially longitudinal direction.

13. The vehicular seat according to claim 1, wherein, except for lower portions of the back frame, the back shell envelops the entire back frame on all sides.

14. The vehicular seat according to claim 1, wherein displacement of said intermediate member along the substantially horizontal direction is independent of displacement of said intermediate member along the substantially longitudinal direction.

15. The vehicular seat according to claim 1, further comprising a back interface surface comprising all areas of the vehicular seat that directly interface with the passenger's back, and
wherein the back shell supports the entire interface surface.

* * * * *